(12) United States Patent
Updegrove et al.

(10) Patent No.: US 6,376,800 B1
(45) Date of Patent: Apr. 23, 2002

(54) MASKANT FOR USE DURING LASER WELDING OR DRILLING

(75) Inventors: Kevin Updegrove; Michael Foster, both of Carson City, NV (US)

(73) Assignee: Chromalloy Gas Turbine Corporation, San Antonio, TX (US)

( * ) Notice: Subject to any disclaimer, the term of this patent is extended or adjusted under 35 U.S.C. 154(b) by 0 days.

(21) Appl. No.: 09/587,205

(22) Filed: Jun. 5, 2000

Related U.S. Application Data

(62) Division of application No. 09/371,380, filed on Aug. 10, 1999, now Pat. No. 6,107,598.

(51) Int. Cl.⁷ ................................................ B23K 26/00
(52) U.S. Cl. .............................. 219/121.85; 219/121.6; 219/121.67; 219/121.68; 219/121.69
(58) Field of Search ......................... 219/121.85, 121.6, 219/121.67, 121.68, 121.69

(56) References Cited

U.S. PATENT DOCUMENTS

| 4,239,954 A | * | 12/1980 | Howard et al. ....... 219/121 EH |
| 4,617,202 A | * | 10/1986 | Baldi .......................... 427/253 |
| 4,726,104 A | * | 2/1988 | Foster et al. ........... 29/156.8 B |

* cited by examiner

*Primary Examiner*—M. Alexandra Elve
(74) *Attorney, Agent, or Firm*—Mitchell D. Bittman

(57) ABSTRACT

A maskant is provided for use during laser welding or drilling comprising a paste of metallic powder and silica.

7 Claims, No Drawings

MASKANT FOR USE DURING LASER WELDING OR DRILLING

This application is a Divisional of Ser. No. 09/371,380 filed Aug. 10, 1999, U.S. Pat No. 6,107,598.

BACKGROUND

A maskant has been developed for use during laser welding or drilling of components, particularly components with protective coatings. The maskant is particularly useful when performing laser welding operations on turbine blades with ceramic thermal barrier coatings. The maskant improves the yield when performing weld operations on certain components, thereby reducing rework, scrap, and associated costs.

Current configuration turbine blades receive ceramic thermal barrier coatings. The ceramic coatings are typically in the range of 0.003"–0.00711" thick. Conventional weld repair procedures require the removal of any coatings from the base alloy immediately adjacent to the weld areas to avoid contamination of the weld and to minimize cracking. During welding of the tip of a gas turbine engine blade when the laser beam makes the initial passes around the blade there is "overhanging" laser light that passes down the sides of the airfoil. The overhanging laser light does not cause damage on many part configurations; however, when blades exhibit a step caused by the local removal of the thermal barrier coating there is a problem. The overhanging beam often strikes the edge of the ceramic. The ceramic material (generally yttria stabilized zirconia) has a tendency to preferentially absorb the laser light from a $CO_2$ laser. The very low thermal conductivity of the ceramic does not allow the heat to dissipate readily. The ceramic then melts, causing subsequent melting and deep pitting of the base alloy, resulting in damage or destruction of the part being welded.

One solution is to remove the ceramic to a level where it will not melt when hit by the laser beam (because the beam is sufficiently defocused). Unfortunately, removing the ceramic to that level exceeds the maximum allowable amount of coating removal for certain types of repair. The laser beam cannot be positioned in such a way that it does not overhang the edge of the blade, or there will be incomplete fusion at the base of the weld.

Another solution is to physically mask the edge of the ceramic to protect it from the laser beam. The edge of the ceramic can not be readily protected by a hard mechanical mask, since the mask must fit the part perfectly in order to block the laser beam. Custom masks would have to be created for each blade to be welded in order to take into account slight variations in the contour of each individual piece. Production of such custom masks is prohibitively time consuming and expensive.

DETAILED DESCRIPTION

This invention describes a method of protecting the edge of the ceramic thermal barrier coating on a component by coating the ceramic edge with a suitable maskant. The maskant material is capable of withstanding the extreme temperatures encountered during the laser weld or drilling process. The maskant is also able to dissipate the concentrated heat absorbed when struck by the laser beam. The maskant is also inert with respect to the component being welded.

The maskant of this invention consists of a mixture of powdered metal particles, silica and solvent (preferably water) in amounts sufficient to form a paste-like consistency. Preferably the paste is metallic powder in a suspension of colloidal silica in water. While a binder can be used to bind the paste to the component, preferably a colloidal silica acts as a binder to hold the metal powder together and to adhere the paste to the part being welded. The paste consistency is easy to apply to the component surface and conforms to the non-uniform shapes. The metal powder used is compatible with the base alloy of the metallic component, ie. it will not contaminate or detrimentally affect the component alloy. Preferably the metallic particles are the same alloy powder used as filler by the laser welding system and typically the powder is the same as the component base alloy.

Generally the colloidal silica in a water suspension is added to the metallic powder in a quantity sufficient to form a paste-like consistency. Typically the maskant comprises 75 to 90% by weight of metallic powder 3 to 10% by weight of colloidal silica and 5 to 15% by volume of water. The metal powder is mixed with the silica suspension to form a paste, which is then applied by painting over the area to be protected, e.g. covering the edge of the ceramic on the part to be welded. The maskant is capable of dissipating the heat resulting from an overhanging laser beam strike. If there is localized melting of the maskant it does not typically adhere strongly to the side of the blade, and can therefore be easily removed after welding is completed. Since the silica is inert and the metal powder is compatible with or matches the component alloy, there is no contamination. After the weld process is complete a light gritblast operation is used to clean the residual maskant from the part.

The benefits of this invention are as follows: the maskant may be easily mixed and applied to components with uneven contours and it retains its shape and adheres to the components even after drying; the composition of the maskant is easily tailored to match different base alloy configurations by changing the alloy powder used; the maskant is capable of withstanding extremely high preheat and weld temperatures-it has been tested at over 2000° F.; the maskant does not interfere with the close fit of induction coils that are often required to preheat sophisticated superalloys prior to welding; the maskant is easily removed after use, with complete removal easily verified; and the silica binder used is completely inert, and does not act to contaminate the weld.

EXAMPLE 1

A thermal barrier coated high pressure turbine blade cast from directionally solidified Rene 142 material was processed through the initial operations required for tip weld repair. The ceramic coating and underlying platinum-aluminide bond coat was removed using conventional grit blast procedures. The coatings were removed for a distance of approximately 0.100 inches below the tip cap surface. Preweld stress relieve heat treatment was performed, and thermal fatigue cracks were manually weld repaired. The tip of the blade was ground flat to prepare for laser weld restoration. X-ray and fluorescent penetrant inspections were performed. The edge of the ceramic at the blade tip was painted with a single coat of maskant, with the layer of maskant about ⅛ inch thick. The maskant consisted of 5 grams Rene 142 weld powder mixed to the consistency of a thick paste with 0.3 grams colloidal silica in 0.7 ml of water (LUDOX® HS-30 colloidal silica, 30 wt % suspension in water by Aldrich Chemical Co., Inc.). The maskant was allowed to dry at room temperature for approximately ½ hour. The blade tip was then welded using an interactive laser welding system as described in U.S. Pat. No. 5,554,837, with induction preheat to a temperature exceeding 1550° F. prior to the start of welding. After the weld operation the blade was allowed to cool to room temperature. The blade tip was then sectioned for metallurgical evaluation. Some of the R142 powder on the external surfaces melted, forming small globules or beads. The beads were separated from the blade by a layer of unmelted powder. There was no detectable affect to the blade base alloy or the ceramic thermal barrier coating.

EXAMPLE 2

A thermal barrier coated high pressure turbine blade cast from directionally solidified Rene 142 material was processed through the initial operations required for tip weld repair. The ceramic coating and underlying platinum-aluminide bond coat was removed using conventional grit blast procedures. The coatings were removed for a distance of approximately 0.100 inches below the tip cap surface. Preweld stress relieve heat treatment was performed, and thermal fatigue cracks were manually weld repaired. The tip of the blade was ground flat to prepare for laser weld restoration. X-ray and fluorescent penetrant inspections were performed. The edge of the ceramic at the blade tip was painted with a single coat of maskant with the layer of maskant about ⅛ inch thick. The weld mask consisted of 5 grams Rene 142 weld powder mixed to the consistency of a thick paste with 0.3 grams colloidal silica in 0.7 ml of water. The maskant was allowed to dry at room temperature for approximately ½ hour. The blade tip was then welded using an interactive laser welding system as described in U.S. Pat. No. 5,554,837 with induction preheat to a temperature exceeding 1550° F. prior to the start of welding. After the weld operation the blade was allowed to cool to room temperature. The tip of the blade was lightly blasted using 400 grit aluminum oxide at 40 psi to remove the maskant. After blasting there was no trace of residual maskant on the blade. Visual inspection using a 40X binocular microscope confirmed that all maskant had been removed.

What is claimed is:

1. A composition for masking an external surface of a metallic component against laser welding or drilling of the metallic component consisting essentially of a paste of metallic powder and silica effective to dissipate the energy resulting from an overhanging laser beam strike with the metallic powder melting to form small globules or beads.

2. Composition of claim 1 wherein the silica is a colloidal silica which acts as a binder to bind the paste to the metallic component.

3. Composition of claim 1 further comprising a binder.

4. Composition of claim 2 wherein the metallic powder is of a composition which is compatible with that of the metallic component.

5. Composition of claim 4 wherein the metallic powder is the same composition as the metallic component.

6. Composition of claim 5 wherein the metallic component is a gas turbine engine component comprising a superalloy composition.

7. Composition of claim 4 comprising 75 to 90% by weight metallic powder and 3 to 10% by weight colloidal silica.

* * * * *